(12) United States Patent
Hashimoto et al.

(10) Patent No.: US 8,797,617 B2
(45) Date of Patent: Aug. 5, 2014

(54) IMAGE ESTIMATION APPARATUS, IMAGE PROCESSING APPARATUS AND COMPUTER READABLE MEDIUM

(75) Inventors: Ryoko Hashimoto, Kanagawa (JP); Koichi Sato, Kanagawa (JP); Mohit Jain, Noida (IN)

(73) Assignee: Fuji Xerox Co., Ltd., Tokyo (JP)

( * ) Notice: Subject to any disclaimer, the term of this patent is extended or adjusted under 35 U.S.C. 154(b) by 135 days.

(21) Appl. No.: 13/462,298

(22) Filed: May 2, 2012

(65) Prior Publication Data

US 2013/0163058 A1  Jun. 27, 2013

(30) Foreign Application Priority Data

Dec. 27, 2011 (JP) ................................. 2011-286845

(51) Int. Cl.
*G06K 15/00* (2006.01)
*H04N 1/46* (2006.01)

(52) U.S. Cl.
USPC ......................................... 358/538; 358/1.18

(58) Field of Classification Search
CPC ........................ G06K 9/2054; G06K 9/00463
USPC .............................. 358/1.18, 3.28, 538, 1.14;
382/174–180, 100, 232; 380/210, 287,
380/54; 713/176; 480/460; 386/94;
399/366; 283/902; 726/26, 31
See application file for complete search history.

(56) References Cited

U.S. PATENT DOCUMENTS

| | | | | |
|---|---|---|---|---|
| 5,680,478 A * | 10/1997 | Wang et al. | .................... | 382/176 |
| 6,009,195 A * | 12/1999 | Nakata et al. | .................. | 382/175 |
| 6,909,805 B2 * | 6/2005 | Ma et al. | ......................... | 382/170 |
| 2008/0181396 A1* | 7/2008 | Balakrishnan et al. | ......... | 380/28 |
| 2009/0041352 A1* | 2/2009 | Okamoto | ....................... | 382/176 |
| 2010/0239166 A1* | 9/2010 | Zhang et al. | .................. | 382/176 |

FOREIGN PATENT DOCUMENTS

| | | |
|---|---|---|
| JP | A-07-203180 | 8/1995 |
| JP | A-10-91768 | 4/1998 |
| JP | A-2006-133960 | 5/2006 |

* cited by examiner

*Primary Examiner* — Barbara Reinier
(74) *Attorney, Agent, or Firm* — Oliff PLC (57) ABSTRACT

An image estimation apparatus includes: a forming unit that forms a reference frame with a size determined uniquely in accordance with a size of a recording region where an image is recorded; and an estimating unit that estimates a type of a single image based on a size of a bounding frame around the single image and the size of the reference frame formed by the forming unit, the single image being a target of type inference in an image contained in a designation region in a recording region image which is an image indicating the recording region where an image is recorded.

17 Claims, 4 Drawing Sheets

IMAGE ESTIMATION APPARATUS, IMAGE PROCESSING APPARATUS AND COMPUTER READABLE MEDIUM

CROSS-REFERENCE TO RELATED APPLICATIONS

This application is based on and claims priority under 35 USC 119 from Japanese Patent Application No. 2011-286845 filed on Dec. 27, 2011.

BACKGROUND

Technical Field

The present invention relates to an image estimation apparatus, an image processing apparatus and a computer readable medium.

SUMMARY

According to an aspect of the invention, an image estimation apparatus includes: a forming unit that forms a reference frame with a size determined uniquely in accordance with a size of a recording region where an image is recorded; and an estimating unit that estimates a type of a single image based on a size of a bounding frame around the single image and the size of the reference frame formed by the forming unit, the single image being a target of type inference in an image contained in a designation region in a recording region image which is an image indicating the recording region where an image is recorded.

BRIEF DESCRIPTION OF THE DRAWINGS

Exemplary embodiment(s) of the present invention will be described in detail based on the following figures, wherein.

DETAILED DESCRIPTION

An embodiment of the invention will be described below in detail by way of example with reference to the drawings.

Figure 1:
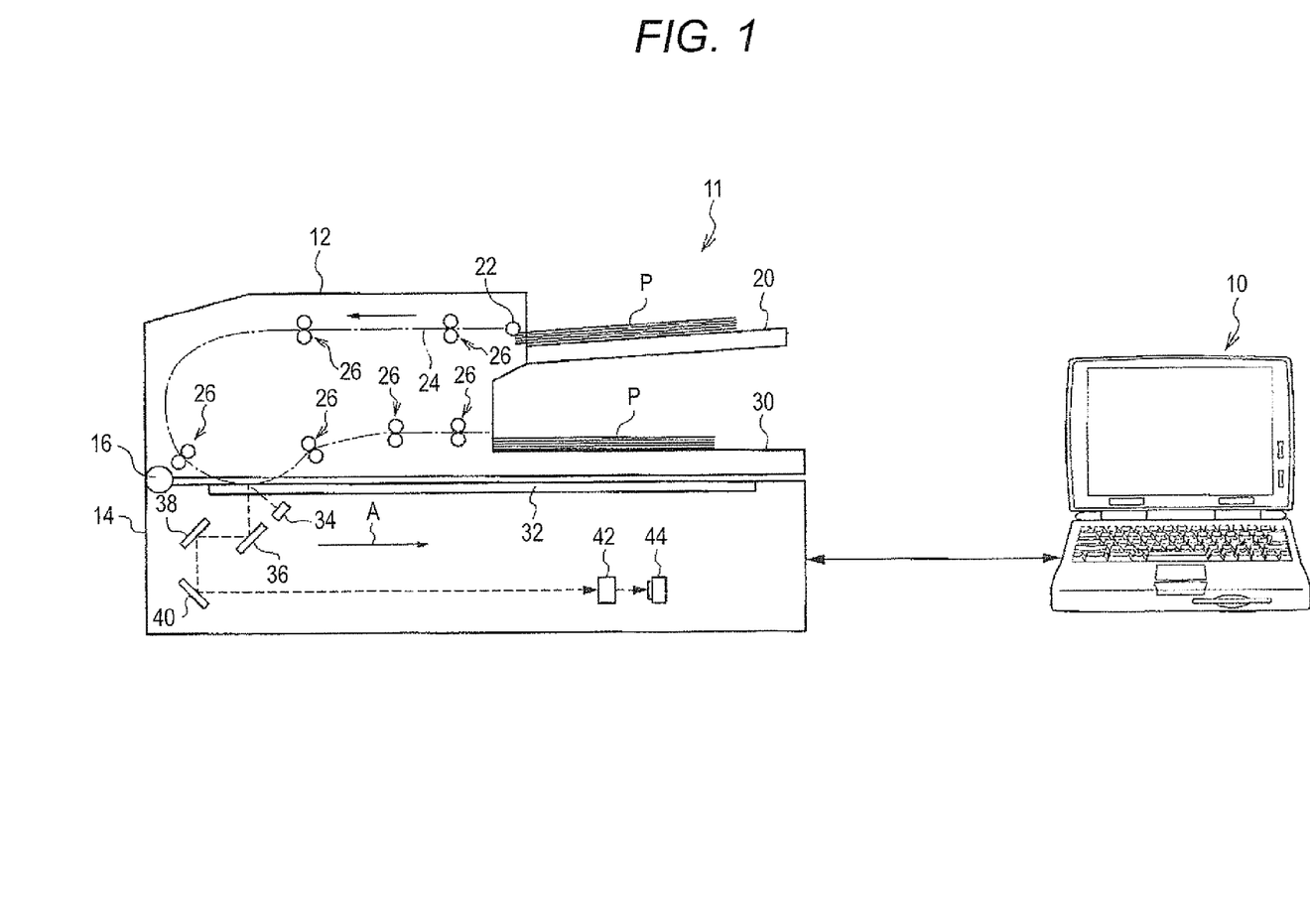
FIG. 1 is a configuration view showing an example of configuration of an image processing apparatus and an image reading apparatus according to an embodiment.

FIG. 1 shows an image processing apparatus 10 according to this embodiment. In this embodiment, a personal computer is used as the image processing apparatus 10. The image processing apparatus 10 is not limited thereto. For example, a micro-computer may be used alternatively. Any apparatus may be used as the image processing apparatus 10 as long as the apparatus is provided with a computer capable of executing a hiding process program which will be described later.

As shown in FIG. 1, an image reading apparatus 11 is connected to the image processing apparatus 10. The image reading apparatus 11 has a document conveyance portion 12, and an image reading portion 14. Incidentally, the document conveyance portion 12 and the image reading portion 14 are connected to each other by a connection portion 16. The document conveyance portion 12 can pivot on the connection portion 16 so as to move close to or away from the image reading portion 14. When the document conveyance portion 12 is rotated so as to move away from the image reading portion 14, a platen glass 32 which will be described later is exposed.

The document conveyance portion 12 has a document holder 20 for placing documents P each having an image recorded on a recording region. The documents P placed on the document holder 20 are one by one paid out by a pay-out roll 22 so as to be fed along a conveyance path 24. After each document P fed along the conveyance path 24 is conveyed up to a document reading position of the image reading portion 14 by pairs of conveyance rolls 26 and an image recorded on one side of the document P is read by the image reading portion 14, the document P is delivered to a delivery portion 30 placed on a downstream side of the document reading position in the conveyance direction.

On the other hand, the image reading portion 14 has the transparent platen glass 32 on which each document P is placed. The aforementioned document reading position is located on an upper surface of the platen glass 32. A light source 34, a first reflecting mirror 36, a second reflecting mirror 38 and a third reflecting mirror 40 are provided on a lower side of the platen glass 32 in the document reading position. The light source 34 radiates illumination light toward a surface of the document P. The first reflecting mirror 36 receives reflection light reflected on the surface of the document P. The second reflecting mirror 38 bends the direction of movement of the reflection light going out from the first reflecting mirror 36. The third reflecting mirror 40 further bends the direction of movement of the reflection light going out from the second reflecting mirror 38 to another direction.

The image reading portion 14 further has a lens 42, and a light detecting portion 44 provided with a large number of photoelectric conversion sensors arranged in one row on a light-receiving surface thereof. The image reading portion 14 reads an image recorded on the surface of the document P while the image is divided into a large number of pixels and decomposed into respective RGB color components by the light detecting portion 44 in such a manner that the reflection light reflected by the third reflecting mirror 40 is focused on the light-receiving surface of the light detecting portion 44 by the lens 42.

Although a fluorescent lamp is used as the light source 34 in the embodiment, the light source 34 is not limited thereto. Any other light source such as LEDs (Light Emitting Diodes) arranged along a direction intersecting with the conveyance direction of the document P may be used alternatively. Although a CCD (Charge Coupled Device) line sensor is used as the light detecting portion 44 in the embodiment, the light detecting portion 44 is not limited thereto. Alternatively, any other solid-state image sensing device such as a CMOS (Complementary Metal-Oxide Semiconductor) image sensor may be used.

In the image reading portion 14 according to this embodiment, the light source 34, the first reflecting mirror 36, the second reflecting mirror 38 and the third reflecting mirror 40 are moved along a direction of arrow A in FIG. 1 (and a direction opposite thereto). Accordingly, when the document conveyance portion 12 is rotated to move away from the image reading portion 14 so that a document P is placed on the upper surface of the exposed platen glass 32, an image recorded on a recording region (a surface being in contact with the upper surface of the platen glass 32) which is a surface of the document P is read inclusively of the recording region (over the whole surface of the document P) in such a manner that the light source 34, the first reflecting mirror 36, the second reflecting mirror 38 and the third reflecting mirror 40 are moved along the direction of the arrow A while illumination light emitted from the light source 34 is radiated onto the document P.

Figure 2:
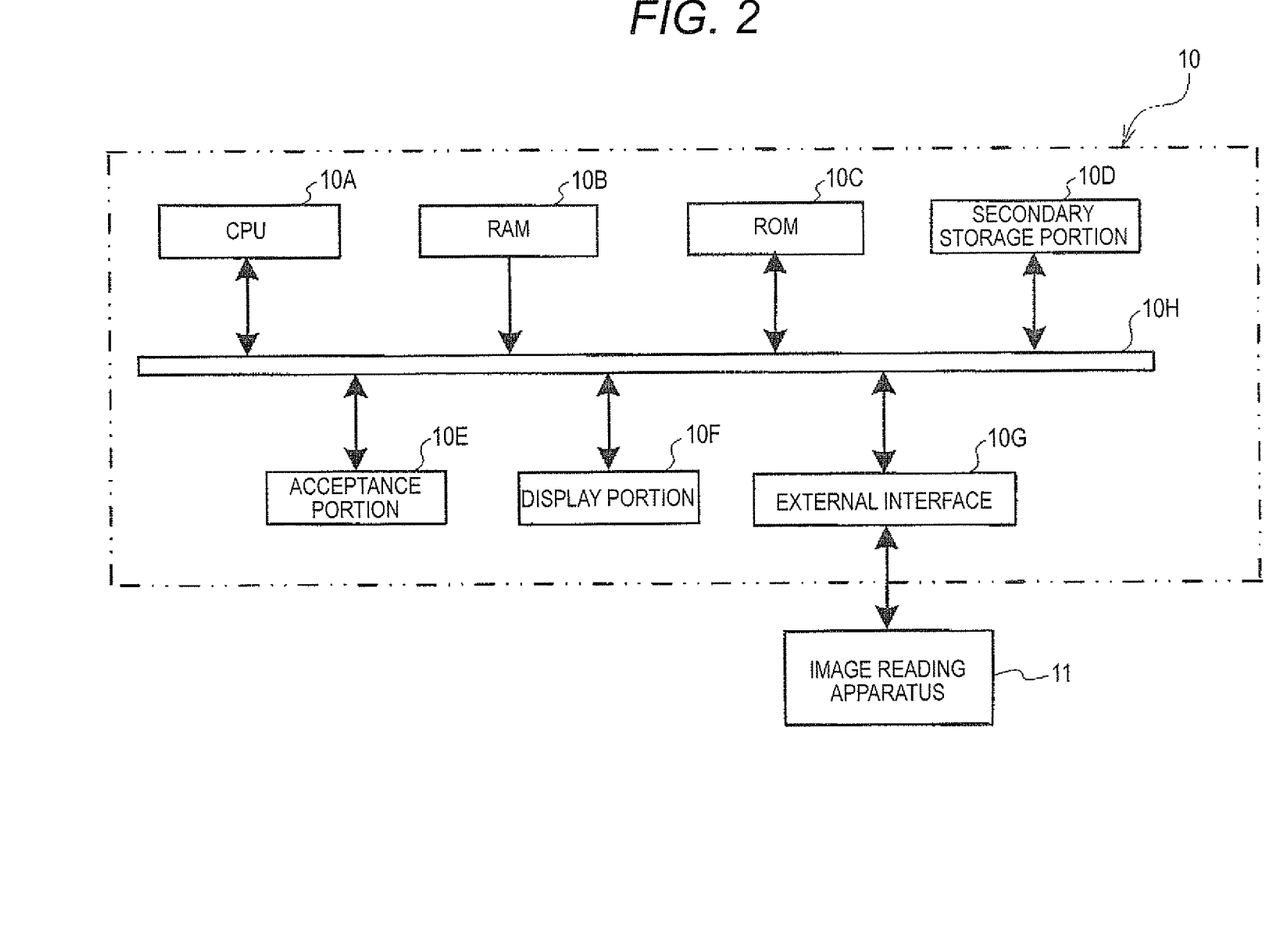
FIG. 2 is a block diagram showing an example of configuration of important part of an electric system in the image processing apparatus according to the embodiment.

FIG. 2 shows an example of configuration of important part of an electric system in the image processing apparatus 10 according to this embodiment. As shown in FIG. 2, the image processing apparatus 10 includes a CPU (Central Processing Unit) 10A, an RAM (Random Access Memory) 10B, an ROM (Read Only Memory) 10C, a secondary storage portion (e.g. a hard disk device) 10D, an acceptance portion (e.g. a mouse and a keyboard) 10E, a display portion (e.g. a liquid crystal display) 10F, and an external interface 10G. The CPU 10A controls operation of the image processing apparatus 10 as a whole. The RAM 10B is used as a work area etc. when the CPU 10A executes various processing programs. Various control programs, various parameters, etc. are stored in the ROM 10C in advance. The secondary storage portion 10D serves as a storage unit which is used for storing various kinds of information. The acceptance portion 10E accepts various kinds of information. The display portion 10F displays various kinds of information. The external interface 10G is connected to an external apparatus (e.g. the image reading apparatus 11 in this embodiment) such as a printer (an image forming apparatus), a personal computer (PC) or the image reading apparatus 11 and performs transmission of image information to the external apparatus or exchange of various kinds of information with the external apparatus. These respective portions are electrically connected to one another through a bus 10H such as an address bus, a data bus or a control bus.

Accordingly, the CPU 10A performs access to the RAM 10B, the ROM 10C and the secondary storage portion 10D, acquisition of various kinds of information accepted through the acceptance portion 10E, display of various kinds of information on the display portion 10F and exchange of various kinds of information with the image reading apparatus 11 through the external interface 10G.

The image processing apparatus 10 configured thus has functions of performing various processes on image information expressing an image recorded on a recording region of a document P. For example, as one of the functions, there is a hiding process function for performing a hiding process on a region to be hidden (hereinafter referred to as "hiding-target region") designated in an image expressed by image information inputted from the image reading apparatus 11. "Hiding" mentioned herein has a meaning that the hiding-target region is completely covered with a specific color in order to prevent the hiding-target region from being visually recognized, and a meaning that a pattern, a picture, or the like, allowing visual recognition of a part of the hiding-target region is superposed on the hiding-target region.

First, as a prerequisite for operating the hiding process function of the image processing apparatus 10, it is necessary to designate a hiding-target region in an image recorded on a recording region of a document P. As a designation method heretofore known as a method for designating a hiding-target region, there is, for example, a designation method using a polygonal frame or a curved frame (hereinafter referred to as "designation frame"). That is, this is a method of recording a designation frame on a recording region so that a region surrounded by the designation frame is set as a designated region (hereinafter referred to as "designation region"). In the background art, a designation region designated by such a designation method was set as a hiding-target region so that, for example, the entire region surrounded by the designation frame was hidden by an existing hiding method (uniform hiding method). There was however a possibility that a region not intended by a user would be hidden by this designation method. One of reasons why the unintended region is hidden in this manner is that the type of an image contained in the designation region cannot be estimated accurately.

On the other hand, the image processing apparatus 10 according to this embodiment operates the hiding process function to accurately infer the type of an image contained in a designation region surrounded by a designation frame to thereby hide a specific region contained in the designation region by a hiding method corresponding to the estimated image type.

The designation frame used in this embodiment has an attribute different from that of an image (e.g. an image to be hidden in this embodiment (hereinafter referred to as "hiding-target image") except the designation frame recorded on the recording region. That is, the hiding-target image is set as an image recorded with an achromatic (e.g. black in the embodiment) color material, whereas the designation frame is set as a thick line image recorded with a writing material (e.g. a fluorescent color marker) so as to be painted with a chromatic color (e.g. a fluorescent pink color) material which can be recognized by the image reading apparatus 11 but can be seen through so that the hiding-target image (an image located just under the designation frame) can be visually recognized in an overlapping region where the designation frame is recorded so as to overlap with the hiding-target image. Description will be described below on the assumption that the base color of each document P is white, the hiding-target image is recorded with a black color material on the blank document P, and the designation frame is recorded with a fluorescent color marker on the recording region.

In the image processing apparatus 10 according to this embodiment, various processes for achieving the hiding process function are implemented by a software configuration. For example, there is a mode in which a computer is used to execute a program. However, implementation of the various processes is not limited to such a software configuration. It is a matter of course that the various processes may be implemented by a hardware configuration or by combination of a hardware configuration and a software configuration.

Description will be described below in the case where the CPU 10A of the image processing apparatus 10 according to this embodiment implements the hiding process function by executing the hiding process program. In this case, there may be used a form in which the hiding process program is stored in the secondary storage portion 10D in advance, a form in which the hiding process program is provided in a state in which the hiding process program is stored in a recording medium whose storage contents can be read by a computer, a form in which the hiding process program is distributed through a wire or wireless communication unit, etc.

Figure 3:
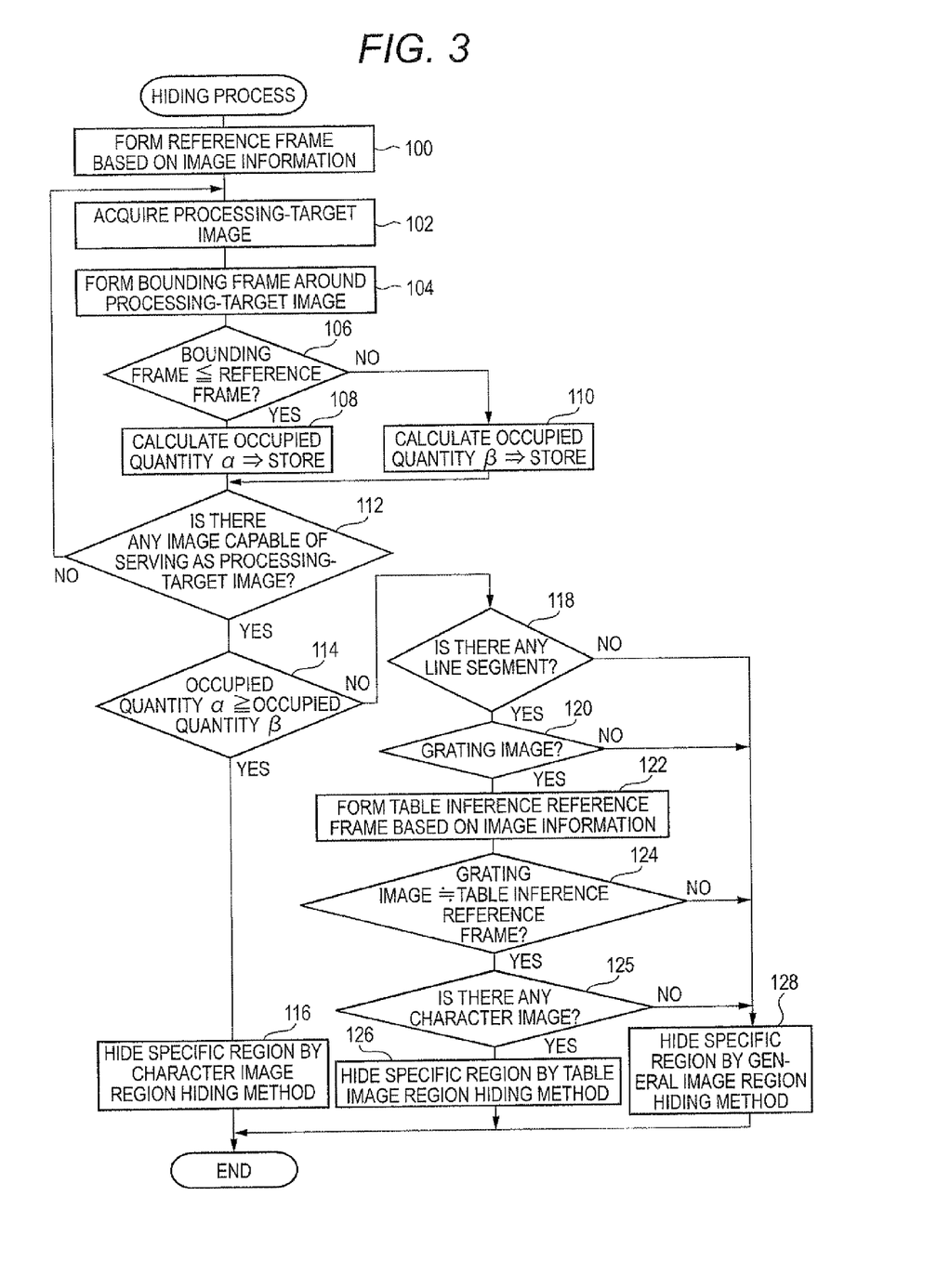
FIG. 3 is a flow chart showing an example of a processing flow in a hiding process program according to an embodiment.
Figure 4:
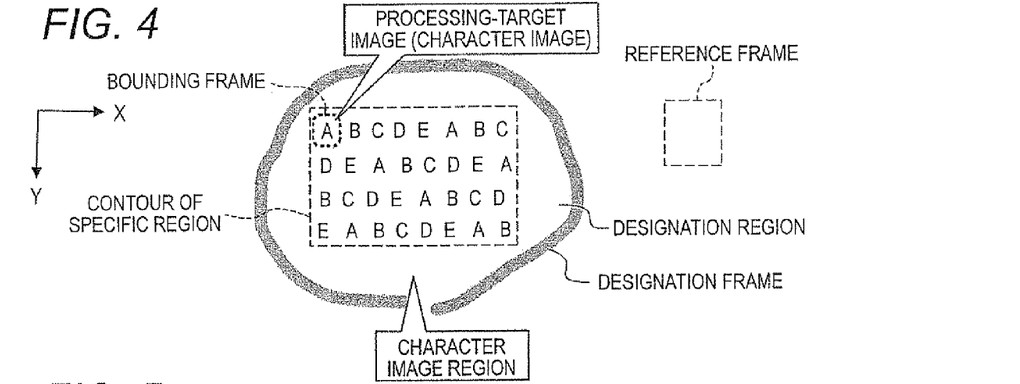
FIG. 4 is a schematic view showing an example of a state where a plurality of character images are contained in a designation region.
Figure 5:
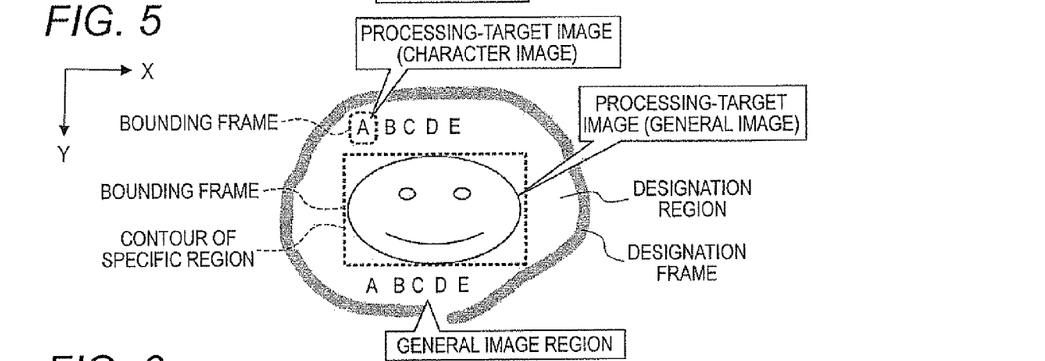
FIG. 5 is a schematic view showing an example of a state where a plurality of character images and a general image are contained in a designation region.

FIG. 3 is a flow chart showing an example of a processing flow in the hiding process program according to this embodiment. Incidentally, to avoid complication, description will be made below in the case where the target of processing is image information (hereinafter referred to as "processing-target image information") which is imported into the image processing apparatus 10 from the image reading apparatus 11 and which expresses an image on the whole of a recording region when the image of the recording region including a hiding-target image recorded with a black color material is recorded on the recording region of a blank document P and a designation frame is recorded. To avoid complication, description will be made below on the assumption that the contour of the recording region is shaped like a rectangle (a standardized rectangle such as A4 or A5). To avoid complication, description will be made below on the assumption that the contours of character images expressing characters are surrounded by the contour of a designation frame (e.g. the outer contour of a designation frame), for example, as shown in FIGS. 4 and 5, in the case where the character images are included in the recording region. Description will be made on the assumption that the contour of a table image expressing a table is surrounded by the contour of a designation frame in the case where the table image is included in the recording region. Description will be made on the assumption that the contour of another general image than character images and a table image is surrounded by the contour of a designation frame (e.g. the outer contour of a designation frame), for example, as shown in FIG. 5, when the general image is included in the recording region.

In step 100 in FIG. 3, a reference frame determined uniquely in accordance with the size of an image of a recording region expressed by processing-target image information is formed. Then, the processing flow goes to step S102. In this embodiment, for example, a rectangular frame shown in FIG. 4 is used as the "reference frame". However, the reference frame is not limited thereto. For example, a circular frame or another polygonal frame than the rectangular frame may be used alternatively. The reference frame according to the embodiment is provided as a rectangular frame with a size determined uniquely in accordance with the vertical length and the lateral length of the image of the recording region. For example, the vertical length of the reference frame is set to have a value obtained by multiplying the vertical length of the image of the recording region by a predetermined coefficient $\alpha$ (e.g. 0.1). The lateral length of the reference frame is set to have a value obtained by multiplying the lateral length of the image of the recording region by a predetermined coefficient $\beta$ (e.g. 0.12). Any coefficients may be used as the predetermined coefficients $\alpha$ and $\beta$ as long as the coefficients can be used for setting the vertical length and the lateral length of a bounding rectangular frame around a maximum (e.g. 16 pt) character of a size range (e.g. not smaller than 8 pt and not larger than 16 pt with respect to a recording region of an A4 size) of character images expressing characters expected to be recorded on the recording region.

In the step 102, a single image as a target of processing (processing-target image) is acquired from a hiding-target image contained in a designation region in the image of the recording region expressed by the processing-target image information. Incidentally, the "processing-target image" mentioned herein means an image, for example, formed from a set of continuous specific color (e.g. black in this embodiment) pixels, that is, a set of continuous black (specific color) pixels adjacent to one another. In this step, the type of the processing-target image is unknown.

In the next step 104, a bounding frame around the processing-target image acquired by the process of the step 102 is formed. Specifically, four X-Y coordinate values are extracted on the basis of the single image (the processing-target image) in the X-Y coordinate system shown in FIGS. 4-6. These X-Y coordinate values are the maximum X-value and the maximum Y-value, the maximum X-value and the minimum Y-value, the minimum X value and the maximum Y-value and the minimum X-value and the minimum Y-value in the single image. The bounding frame is set to be a bounding rectangular frame surrounding and contacting with a rectangle which has the four X-Y coordinate values.

Then, the processing flow goes to step 106. Incidentally, the bounding rectangular frame is used as the "bounding frame" in the embodiment. However, the "bounding frame" is not limited thereto. A bounding circular frame or another bounding polygonal frame than the rectangular frame may be used alternatively as long as these bounding frames contain the single image (the processing-target image) therein and do not contain another image different from the single image therein. It is however preferable that the "bounding frame" is a frame with a shape similar to that of the reference frame.

In the step 106, determination is made as to whether the bounding frame formed by the process of the step 104 is included (embraced) in the reference frame formed by the process of the step 100 or not. When the determination results in "Yes", the processing-target image is estimated to be a character image. Then, the processing flow goes to step 108. When the determination results in "No", the target processing image is estimated to be another image than the character image. Then, the processing flow goes to step 110.

In the step 108, the occupied quantity $\alpha$ of processing-target images estimated to be character images in the designation region among processing-target images acquired until the present time since start of the hiding process program is calculated and a result of the calculation is overwritten and stored (recorded) in a predetermined storage region $\alpha 1$ (e.g. a predetermined storage region of the RAM 10B). Then, the processing flow goes to step 112. The "occupied quantity $\alpha$" mentioned herein means the ratio of the total area of bounding frames around processing-target images (the sum of respective areas of bounding frames around processing-target images estimated to be character images among the processing-target images acquired until the present time from start of the hiding process program) to the area of the designation region. However, the occupied quantity $\alpha$ is not necessarily limited to the ratio of the total area of bounding frames around the character images to the area of the designation region. For example, the occupied quantity $\alpha$ may be simply the number of bounding frames around the character images or may be (the number of bounding frames around the character images)/(the area of the designation region).

In the step 110, the occupied quantity $\beta$ of processing-target images estimated to be other images than character images in the designation region among processing-target images acquired until the present time since start of the hiding process program is calculated and a result of the calculation is overwritten and stored (recorded) in a predetermined storage region $\beta 1$ (e.g. a predetermined storage region of the RAM 10B). Then, the processing flow goes to the step 112. The "occupied quantity $\beta$" mentioned herein means the ratio of the total area of bounding frames around the processing-target images estimated to be other images than character images (the sum of respective areas of bounding frames around the processing-target images estimated to be other images than character images among the processing-target images acquired until the present time since start of the hiding process program) to the area of the designation region. However, the occupied quantity $\beta$ is not necessarily limited to the ratio of the total area of bounding frames around other images than character images to the area of the designation region. For example, the occupied quantity $\beta$ may be simply the number of bounding frames around other images than character images or may be (the number of bounding frames around other images than character images)/(the area of the designation region).

In the step 112, determination is made as to whether there is any image capable of serving as a processing-target image in the designation region in the image of the recording region expressed by the processing-target image information or not. When the determination results in "Yes", the processing flow goes back to the step 102. On the other hand, when the determination results in "No", the processing flow goes to step 114.

In the step 114, determination is made as to whether the condition that the occupied quantity α stored in the storage region α1 is not smaller than the occupied quantity β stored in the storage region β1 is satisfied or not. When the determination results in "Yes", the designation region is estimated to be a character image region including one or more character images, for example, as shown in FIG. 4 (a character image region including character images in the example shown in FIG. 4). Then, the processing flow goes to step S116. On the other hand, when the determination results in "No", the designation region is estimated to be a non-character image region including one or more images other than character images. Then, the processing flow goes to step 118.

In the step 116, a specific region included in the designation region in the image of the recording region expressed by the processing-target image information is hidden by a hiding method determined uniquely in accordance with the character image region. That is, in this embodiment, the entire region surrounded by the contour of a bounding rectangular frame around the designation region is painted out to thereby hide the specific region included in the designation region. Incidentally, the "specific region" in the case where the designation region is estimated to be a character image region means a region included in the designation region. For example, the "specific region" is the entire region included in the designation region. That is, in the process of the step 116, the entire region in the bounding rectangular frames around the character images included in the designation region is the "specific region", so that the entire region surrounded by the contour of the bounding rectangular frame around the designation region is hidden to thereby hide the specific region.

Description is made here on the assumption that the character images are surrounded by the contour of the designation region. Accordingly, in the process of the step 116, the entire region surrounded by the contour of the bounding rectangular frame around the designation region is painted out to thereby hide all the regions which are included in the bounding rectangular frames around the character images respectively and which are the specific region included in the designation region. Alternatively, when the character images are partially out of the designation region across the contour of the designation region, an entire region surrounded by the contour of a bounding rectangular frame around a combination region obtained by adding a continuous line portion extending over the contour of the designation region to the designation region may be painted out to thereby hide the specific region included in the designation region. In addition, with respect to the character images in the designation region, all the regions surrounded by the contours of the bounding rectangular frames around the character images respectively may be painted out to thereby hide the entire region of the character images which is the specific region included in the designation region. It is preferable that the entire region surrounded by the contour of the designation region is painted out when contents recorded in the recording region are intended to be hardly estimated.

Figure 6:
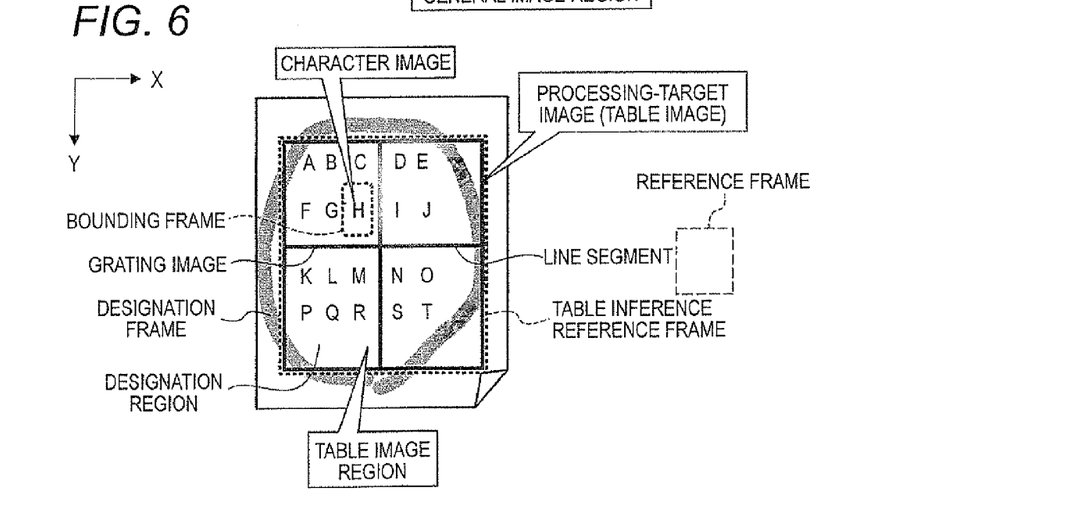
FIG. 6 is a schematic view showing an example of a state where a plurality of character images are contained in a designation region.

In the step 118, determination is made as to whether there is any specific color line segment (e.g. a black line segment in the embodiment) in the designation region estimated to be a non-character image region or not. That is, when a specific color line segment capable of serving as a constituent member of a table is detected from the image included in the designation region, the determination results in "Yes". Otherwise, the determination results in "No". For example, a black line segment not shorter than a predetermined length (e.g. a line segment not shorter than 5 mm) may be used as the black line segment capable of serving as a constituent member of a table. When the determination in the step 118 results in "Yes", the processing flow goes to step 120. In the step 120, determination is made as to whether an image obtained by following a line continuous to the line segment detected by the process of the step 118 is a grating image or not. That is, when a grating image formed by the line connecting to the line segment included in the designation region is detected, for example, as shown in FIG. 6, the determination results in "Yes". Otherwise, the determination results in "No". In other words, it may be said that the grating image is a rectangular image including regions divided like a mesh. The "grating image" mentioned herein does not include a mere rectangular frame. If the mere rectangular frame is placed as a "table", the mere rectangular frame may be included in the concept "grating image".

When the determination in the step 120 results in "Yes", the processing flow goes to step 122. In the step 122, a table inference reference frame determined uniquely in accordance with the size of the image of the recording region expressed by the processing-target image information is formed. Then, the processing flow goes to step 124. Incidentally, in this embodiment, a rectangular frame having a larger area than the area of the reference frame, for example, as shown in FIG. 6 is used as the "table inference reference frame". The "table inference reference frame" is not limited thereto. A circular frame or another polygonal frame than the rectangular frame may be used alternatively. The table inference reference frame according to this embodiment is provided as a rectangular frame having a size determined uniquely in accordance with the vertical length and the lateral length of the image of the recording region. For example, the vertical length of the reference frame is set to have a value obtained by multiplying the vertical length of the image of the recording region by a predetermined coefficient γ (e.g. 0.3). The lateral length of the reference frame is set to have a value obtained by multiplying the lateral length of the image of the recording region by a predetermined coefficient ε (e.g. 0.3). Any coefficients may be used as the predetermined coefficients γ and ε as long as the coefficients can be used for obtaining the minimum values (e.g. ⅓ of the vertical length of the image of the recording region and ⅓ of the lateral length of the image of the recording region) of a size range (e.g. ⅓ to ½, both inclusively, of the vertical length of the image of the recording region and ⅓ to ⅔, both conclusively, of the lateral length of the image of the recording region with respect to the image of the A4-size recording region) of a table image expressing a table expected to be recorded with respect to the image of the recording region.

In the step 124, determination is made as to whether the size of the grating image detected by the process of the step 120 and the size of the table inference reference frame formed by the process of the step 122 are substantially equal to each other or not. When the determination results in "Yes", the designation region is estimated to be a table image region including a table image. Then, the processing flow goes to step 125. In the embodiment, in the process of the step 124, determination is made as to whether the contour of the grating image detected by the process of the step 120 and the contour of the table inference reference frame formed by the process of the step 122 overlap with each other within a predetermined error or not. The determination is not limited thereto. Alternatively, determination may be made as to whether the area of the grating image and the area of the entire region surrounded by the table inference reference frame are substantially equal to each other within a predetermined error or not.

In the step 125, determination is made as to whether character images are contained in the region surrounded by the contour of the grating image detected by the process of the step 120 or not. That is, when character images are detected by execution of the processes corresponding to the steps 102 to 106, the determination results in "Yes" and the processing flow goes to step 126. Otherwise, the determination results in "No" and the processing flow goes to step 128. A generally conceptualized table is regarded as a table containing characters in its frame. Therefore, in this embodiment, existence of character images is regarded as a prerequisite for a table image as described above.

In the step 126, the specific region included in the designation region in the image of the recording region expressed by the processing-target image information is hidden by a hiding method determined uniquely in accordance with the table image region. That is, in this embodiment, the entire region surrounded by the contour of the bounding rectangular frame around the designation region is painted out to thereby hide the specific region included in the designation region. The "specific region" in the case where the designation region is estimated to be a table image region means a region included in the designation region, e.g. the entire region included in the designation region. That is, the entire region included in the designation region is the "specific region", so that the entire region surrounded by the contour of the bounding rectangular frame around the designation region is hidden to thereby hide the specific region in the process of the step 126.

Description is made here on the assumption that the table image is surrounded by the contour of the designation region. Accordingly, in the process of the step 126, the entire region surrounded by the contour of the bounding rectangular frame around the designation region is painted out to thereby hide the entire region of the table image which is the specific region included in the designation region. When, for example, the contour of the table image is partially out of the designation region across the contour of the designation region as shown in FIG. 6, the entire region (specific region) surrounded by the contour of the table image may be painted out to thereby hide the specific region included in the designation region. When not the whole of the table image but a cell region (a split region) contained in the table image is set as the designation region, an entire region (specific region) surrounded by the contour of the cell region may be painted out to thereby hide the specific region included in the designation region. In this case, the entire region surrounded by the contour of the cell region may be painted out even when the contour of the cell region is partially out of the designation region across the contour of the designation region.

When the determination in the step 118, 120 or 124 results in "No", the designation region is estimated to be a general image region including a general image (e.g. a so-called photographic image). Then, the processing flow goes to step 128. In the step 128, the specific region included in the designation region is hidden by a hiding method determined uniquely in accordance with the general image region. That is, in this embodiment, the entire region surrounded by the contour of the bounding rectangular frame around the designation region is painted out to thereby hide the specific region included in the designation region. Incidentally, the "specific region" in the case where the designation region is estimated to be a general image region means a region included in the designation region, e.g. the entire region included in the designation region. That is, the entire region included in the designation region is the "specific region", so that the entire region surrounded by the contour of the bounding rectangular frame around the designation region is hidden in the process of the step 128.

Description is made here on the assumption that the general image is surrounded by the contour of the designation region. Accordingly, in the process of the step 128, the entire region surrounded by the contour of the bounding rectangular frame around the designation region is painted out to thereby hide the entire region of the general image which is the specific region included in the designation region. When the contour of the general image is partially out of the designation region across the contour of the designation region, the entire region (specific region) surrounded by the contour of the general image may be painted out to thereby hide the specific region included in the designation region.

When the specific region in the image of the recording region is hidden by the process of the step 116, 126 or 128, the hidden image may be displayed on the display portion 10F. If a printer is connected to the image processing apparatus 10, the printer may be used to record the hidden image on a recording medium (e.g. a sheet of paper). Image information expressing the hidden image may be stored in the secondary storage portion 10D. The image information expressing the hidden image may be transmitted to an external apparatus so that the image information expressing the hidden image can be stored in a storage unit (e.g. a hard disk device) of the external apparatus.

As described above in detail, in accordance with the image processing apparatus according to this embodiment, a reference frame with a size determined uniquely in accordance with a recording region is formed, the type of a processing-target image in an image included in a designation region in the recording region is estimated based on the size of a bounding frame around the processing-target image and the size of the reference frame, and a specific region included in the designation region is hidden by a hiding method determined uniquely in accordance with the estimated type. Accordingly, an intended region can be hidden more accurately than the case where this configuration is not provided.

Although the embodiment has been described in the case where processing of painting out a specific region contained in a designation region to thereby prevent an image in the specific region from being visually recognized is exemplified as "hiding", the concept "hiding" described in the embodiment is not limited thereto. For example, the concept "hiding" may include "hatching" in the specific region. "Hatching" means processing using a pattern, a character, a color or a combination thereof to make part of the image in the specific region visually recognizable when the pattern, the character, the color or the combination thereof is superposed on the specific region.

Although the embodiment has been described in the case where the reference frame and the table inference reference frame are provided as predetermined frames, the reference frame and the table inference reference frame are not limited thereto. For example, the shape and size of each of the frames may be changed and set in accordance with a user's instruction through the acceptance portion 10E.

Although the embodiment has been described in the case where the occupied quantities α and β are determined in accordance with a predetermined single definition, the occupied quantities α and β are not limited thereto. For example, one definition may be designated from various definitions different in terms of the method of determining the occupied quantities α and β in accordance with a user's instruction through the acceptance portion 10E so that the occupied quantities α and β can be determined in accordance with the designated definition.

Although the embodiment has been described based on a form example in the case where a designation method using a designation frame is used, the invention is not limited thereto. For example, a region merely painted out with a fluorescent color marker may be set as the designation region. Thus, the method of determining the designation region is not limited to one method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image estimation apparatus comprising:
a forming unit that forms a reference frame with a size determined uniquely in accordance with a size of a recording region where an image is recorded; and
an estimating unit that estimates a type of a single image based on a size of a bounding frame around the single image and the size of the reference frame formed by the forming unit, the single image being a target of type inference in an image contained in a designation region in a recording region image which is an image indicating the recording region where an image is recorded,
wherein the estimating unit estimates that the single image as the target of type inference contained in the bounding frame is a character image expressing a character when the bounding frame is included in the reference frame formed by the forming unit, and estimates that the single image as the target of type inference contained in the bounding frame is another image than the character image when the bounding frame is not included in the reference frame formed by the forming unit,
when the estimating unit estimates that the single image is the character image, the estimating unit further estimates that the designation region is a character image region containing one or more character images when an occupied quantity of character images in the designation region is not smaller than an occupied quantity of one or more images other than the character images in the designation region, and
when the estimating unit estimates that the single image is said another image than the character image, the estimating unit further estimates that the designation region is a non-character image region containing one or more images other than character images when an occupied quantity of character images in the designation region is smaller than an occupied quantity of one or more images other than the character images in the designation region.

2. The image estimation apparatus according to claim 1, wherein:
the forming unit further forms a table inference reference frame with a larger size than the size of the reference frame;
the image estimation apparatus further comprises a grating image detecting unit which detects a specific color line segment from the non-character image region estimated by the estimating unit and which detects a grating image including the detected line segment as a constituent member when the line segment is detected; and
the estimating unit further estimates that the non-character image region is a table image region containing a table image indicating a table when both a first condition and a second condition are satisfied, and estimates that the non-character image region is a general image region containing a general image expressing another image than the character image and the table image when at least one of the first and second conditions is not satisfied, the first condition being a condition that a size of the grating image detected by the grating image detecting unit is substantially equal to a size of the table inference reference frame formed by the forming unit, the second condition being a condition that character images are contained in a region surrounded by a contour of the grating image detected by the grating image detecting unit.

3. The image estimation apparatus according to claim 2, wherein:
the table inference reference frame is a rectangular frame with a size determined uniquely in accordance with a vertical length and a lateral length in the recording region.

4. The image estimation apparatus according to claim 1, wherein:
the single image is an image formed from a set of continuous specific color pixels.

5. The image estimation apparatus according to claim 1, wherein:
the reference frame is a rectangular frame with a size determined uniquely in accordance with a vertical length and a lateral length in the recording region.

6. The image estimation apparatus according to claim 1, wherein:
the bounding frame is a bounding rectangular frame around the single image which is the target of type inference.

7. An image processing apparatus comprising:
a forming unit which forms a reference frame with a size determined uniquely in accordance with a size of a recording region where an image is recorded;
an estimating unit which estimates a type of a single image based on a size of a bounding frame around the single image and the size of the reference frame formed by the forming unit, the single image being a target of type inference in an image contained in a designation region in a recording region image which is an image indicating the recording region where an image is formed; and
a hiding unit which hides a specific region contained in the designation region by a hiding method determined uniquely in accordance with the type estimated by the estimating unit,
wherein the estimating unit estimates that the single image as the target of type inference contained in the bounding frame is a character image expressing a character when the bounding frame is included in the reference frame formed by the forming unit, and estimates that the single image as the target of type inference contained in the bounding frame is another image than the character image when the bounding frame is not included in the reference frame formed by the forming unit, when the estimating unit estimates that the single image is the character image, the estimating unit further estimates that the designation region is a character image region containing one or more character images when an occupied quantity of character images in the designation region is not smaller than an occupied quantity of one or more images other than the character images in the designation region, and when the estimating unit estimates that the single image is said another image than the character image, the estimating unit further estimates that the designation region is a non-character image region containing one or more images other than character images when an occupied quantity of character images in the designation region is smaller than an occupied quantity of one or more images other than the character images in the designation region.

8. The image processing apparatus according to claim 7, wherein:

the hiding unit hides the character image region estimated by the estimating unit after shaping the character image region into a predetermined shape to embrace the character image region in the specific region, and hides the specific region contained in the non-character image region estimated by the estimating unit by a hiding method corresponding to the type of each image contained in the specific region.

9. The image processing apparatus according to claim 8, wherein:

the forming unit further forms a table inference reference frame with a larger size than the size of the reference frame;

the image processing apparatus further comprises a grating image detecting unit which detects a specific color line segment from the non-character image region estimated by the estimating unit and which detects a grating image including the detected line segment as a constituent member when the line segment is detected;

the estimating unit further estimates that the non-character image region is a table image region containing a table image indicating a table when both a first condition and a second condition are satisfied, and estimates that the non-character image region is a general image region containing a general image indicating another image than the character image and the table image when at least one of the first and second conditions is not satisfied, the first condition being a condition that a size of the grating image detected by the grating image detecting unit is substantially equal to a size of the table inference reference frame formed by the forming unit, the second condition being a condition that character images are contained in a region surrounded by a contour of the grating image detected by the grating image detecting unit; and the hiding unit hides the character image region estimated by the estimating unit after shaping the character image region into a predetermined shape to embrace the character image region in the specific region, hides an entire region surrounded by a contour of the table image region estimated by the estimating unit, and hides an entire region surrounded by a contour of the general image region estimated by the estimating unit.

10. The image processing apparatus according to claim 8, wherein:

the forming unit further forms a table inference reference frame with a larger size than the size of the reference frame;

the image processing apparatus further comprises a grating image detecting unit which detects a specific color line segment from the non-character image region estimated by the estimating unit and which detects a grating image including the detected line segment as a constituent member when the line segment is detected;

the estimating unit further estimates that the non-character image region is a table image region containing a table image indicating a table when both a first condition and a second condition are satisfied, and estimates that the non-character image region is a general image region containing a general image indicating another image than the character image and the table image when at least one of the first and second conditions is not satisfied, the first condition being a condition that a size of the grating image detected by the grating image detecting unit is substantially equal to a size of the table inference reference frame formed by the forming unit, the second condition being a condition that character images are contained in a region surrounded by a contour of the grating image detected by the grating image detecting unit; and the hiding unit hides the character image region estimated by the estimating unit after shaping the character image region into a predetermined shape to embrace the character image region in the specific region, hides an entire region surrounded by the contour of the grating image detected by the grating image detecting unit, and hides an entire region surrounded by a contour of the general image region estimated by the estimating unit.

11. The image processing apparatus according to claim 8, wherein:

the forming unit further forms a table inference reference frame with a larger size than the size of the reference frame;

the image processing apparatus further comprises a grating image detecting unit which detects a specific color line segment from the non-character image region estimated by the estimating unit and which detects a grating image including the detected line segment as a constituent member when the line segment is detected;

the estimating unit further estimates that the non-character image region is a table image region containing a table image indicating a table when both a first condition and a second condition are satisfied, and estimates that the non-character image region is a general image region containing a general image indicating another image than the character image and the table image when at least one of the first and second conditions is not satisfied, the first condition being a condition that a size of the grating image detected by the grating image detecting unit is substantially equal to a size of the table inference reference frame formed by the forming unit, the second condition being a condition that character images are contained in a region surrounded by a contour of the grating image detected by the grating image detecting unit; and the hiding unit hides the character image region estimated by the estimating unit after shaping the character image region into a predetermined shape to embrace the character image region in the specific region, hides an entire region surrounded by a contour of a cell contained in the grating image detected by the grating image detecting unit and contained in the designation region, and hides an entire region surrounded by a contour of the general image region estimated by the estimating unit.

12. The image processing apparatus according to claim 9, wherein:
the table inference reference frame is a rectangular frame with a size determined uniquely in accordance with a vertical length and a lateral length in the recording region.

13. The image processing apparatus according to claim 7, wherein:
the single image is an image formed from a set of continuous specific color pixels.

14. The image processing apparatus according to claim 7, wherein:
the reference frame is a rectangular frame with a size determined uniquely in accordance with a vertical length and a lateral length in the recording region.

15. The image processing apparatus according to claim 7, wherein:
the bounding frame is a bounding rectangular frame around the single image which is the target of type inference.

16. A non-transitory computer readable medium storing a program causing a computer to execute a process for an image estimating method, the process comprising:
forming a reference frame with a size determined uniquely in accordance with a size of a recording region where an image is recorded; and
estimating a type of a single image based on a size of a bounding frame around the single image and the size of the formed reference frame, the single image being a target of type inference in an image contained in a designation region in a recording region image which is an image indicating the recording region where an image is recorded,
wherein the estimating step includes estimating that the single image as the target of type inference contained in the bounding frame is a character image expressing a character when the bounding frame is included in the formed reference frame, and estimating that the single image as the target of type inference contained in the bounding frame is another image than the character image when the bounding frame is not included in the formed reference frame,
when the single image is estimated as the character image, the process further comprises estimating that the designation region is a character image region containing one or more character images when an occupied quantity of character images in the designation region is not smaller than an occupied quantity of one or more images other than the character images in the designation region, and
when the single image is estimated as said another image than the character image, the process further comprises estimating that the designation region is a non-character image region containing one or more images other than character images when an occupied quantity of character images in the designation region is smaller than an occupied quantity of one or more images other than the character images in the designation region.

17. A non-transitory computer readable medium storing a program causing a computer to execute a process for an image processing method, the process comprising:
forming a reference frame with a size determined uniquely in accordance with a size of a recording region where an image is recorded;
estimating a type of a single image based on a size of a bounding frame around the single image and the size of the formed reference frame, the single image being a target of type inference in an image contained in a designation region in a recording region image which is an image indicating the recording region where an image is recorded; and
hiding a specific region contained in the designation region by a hiding method determined uniquely in accordance with the type estimated by the estimating unit,
wherein the estimating step includes estimating that the single image as the target of type inference contained in the bounding frame is a character image expressing a character when the bounding frame is included in the formed reference frame, and estimating that the single image as the target of type inference contained in the bounding frame is another image than the character image when the bounding frame is not included in the formed reference frame,
when the single image is estimated as the character image, the process further comprises estimating that the designation region is a character image region containing one or more character images when an occupied quantity of character images in the designation region is not smaller than an occupied quantity of one or more images other than the character images in the designation region, and
when the single image is estimated as said another image than the character image, the process further comprises estimating that the designation region is a non-character image region containing one or more images other than character images when an occupied quantity of character images in the designation region is smaller than an occupied quantity of one or more images other than the character images in the designation region.

* * * * *